United States Patent
Takeuchi et al.

(10) Patent No.: US 9,880,721 B2
(45) Date of Patent: Jan. 30, 2018

(54) INFORMATION PROCESSING DEVICE, NON-TRANSITORY COMPUTER-READABLE RECORDING MEDIUM STORING AN INFORMATION PROCESSING PROGRAM, AND INFORMATION PROCESSING METHOD

(71) Applicant: KONICA MINOLTA, INC., Chiyoda-ku, Tokyo (JP)

(72) Inventors: Kazuma Takeuchi, Tokyo (JP); Shinya Ogino, Tokyo (JP); Shunsuke Takamura, Tokyo (JP); Katsuhiko Asai, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 20 days.

(21) Appl. No.: 15/151,534

(22) Filed: May 11, 2016

(65) Prior Publication Data
US 2016/0334975 A1    Nov. 17, 2016

(30) Foreign Application Priority Data
May 12, 2015    (JP) ................ 2015-097501

(51) Int. Cl.
*G06F 3/02* (2006.01)
*G06F 3/0484* (2013.01)
(Continued)

(52) U.S. Cl.
CPC ........ *G06F 3/04845* (2013.01); *G06F 3/0425* (2013.01); *G06F 3/0488* (2013.01);
(Continued)

(58) Field of Classification Search
CPC . G06F 3/0488; G06F 3/04842; G06F 3/04845
See application file for complete search history.

(56) References Cited

U.S. PATENT DOCUMENTS

2004/0252119 A1    12/2004    Hunleth et al.
2006/0001650 A1*   1/2006     Robbins ................ G06F 3/0421
                                                      345/173
(Continued)

FOREIGN PATENT DOCUMENTS

JP    2012-121179 A    6/2012

OTHER PUBLICATIONS

Extended European Search Report dated Oct. 24, 2016, issued by the European Patent Office in corresponding European Application No. 16169202.5. (7 pages).

*Primary Examiner* — Kevin M Nguyen
(74) *Attorney, Agent, or Firm* — Buchanan Ingersoll & Rooney PC

(57) ABSTRACT

An information processing device includes an operation receiver capable of receiving a gesture operation for an object on a screen; and a controller configured to receive an output from the operation receiver and an output from a user motion detector configured to detect whether the gesture operation received by the operation receiver is a two-hand operation or a one-hand operation. The controller sets a size change associated with the resizing to a first degree when the gesture operation for the object is the two-hand operation, and sets a size change associated with the resizing to a second degree which is relatively greater than the first degree when the gesture operation for the object is the one-hand operation on a basis of a user operation detected by the user motion detector, and reflects resizing of the object on the screen on a basis of the set degree.

22 Claims, 9 Drawing Sheets

(51) Int. Cl.
*G06F 3/0488* (2013.01)
*G06F 3/042* (2006.01)

(52) U.S. Cl.
CPC .............. *G06F 3/04883* (2013.01); *G06F 2203/04806* (2013.01); *G06F 2203/04808* (2013.01)

(56) References Cited

U.S. PATENT DOCUMENTS

| | | | |
|---|---|---|---|
| 2012/0223898 A1* | 9/2012 | Watanabe | G06F 3/0485 345/173 |
| 2013/0033422 A1 | 2/2013 | Choi et al. | |
| 2013/0234960 A1* | 9/2013 | Yamamoto | G06F 3/041 345/173 |
| 2013/0265222 A1 | 10/2013 | Berenson et al. | |
| 2015/0097766 A1 | 4/2015 | Kapur et al. | |

\* cited by examiner

INFORMATION PROCESSING DEVICE, NON-TRANSITORY COMPUTER-READABLE RECORDING MEDIUM STORING AN INFORMATION PROCESSING PROGRAM, AND INFORMATION PROCESSING METHOD

CROSS REFERENCE TO RELATED APPLICATIONS

The entire disclosure of Japanese Patent Application No. 2015-097501 filed on May 12, 2015 including description, claims, drawings, and abstract are incorporated herein by reference in its entirety.

BACKGROUND OF THE INVENTION

1. Field of the Invention

The present invention relates to an information processing device, a non-transitory computer-readable recording medium storing an information processing program, and an information processing method which allow for information input using a gesture operation.

2. Description of Related Art

In recent years, information processing devices provided with a touch panel, in which information can be input by directly touching the screen with a contact member such as fingers and a stylus as with smartphones, tablet terminals, or electronic whiteboards have been practically used. When a predetermined gesture operation is performed on the touch panel of the above-mentioned information processing devices, a process assigned to the gesture operation (for example, movement of an object and the like) is executed.

A gesture operation of touching one point on the touch panel is called single touch gesture, and a gesture operation of simultaneously touching two or more points on the touch panel is called multiple touch gesture. In recent years, the progresses of the multiple touch gesture technology have made it possible to perform diversified and complicated operations.

Examples of the gesture operation include pinch-out which is an operation of enlarging an object by touching and sliding two points on the object in such a manner as to move the touch points away from each other, pinch-in which is an operation of reducing the size of an object by touching and sliding two points on the object in such a manner as to bring the touch points close to each other, and the like. In the following description, pinch-out and pinch-in are referred also to as "resizing." It is to be noted that resizing includes, in addition to enlarging/reducing of an object to a similar shape in longitudinal and lateral directions, enlarging/reducing of an object in only a vertical direction or in only a lateral direction.

In conventional information processing devices provided with a touch panel, the expansion-reduction rate of resizing is set in advance, and an object is enlarged or reduced by an amount corresponding to the operation amount [pixel] (change of the distance between two touch points)×the expansion-reduction rate. For example, when the expansion-reduction rate is set to 1.5, an object is enlarged or reduced by an amount corresponding to the operation amount×1.5 [pixel]. When the expansion-reduction rate is set to 1, an object is enlarged or reduced by the operation amount to follow the motion of the finger.

Conventionally, PTL 1 (Japanese Patent Application Laid-Open No. 2012-121179) discloses, as a technique relating to resizing, an image forming apparatus provided with a preview function in which an object is enlarged or reduced to a standard-size size when the operation speed of the resizing, that is, the change speed of the distance between two touch points (hereinafter referred to as "point distance change speed") is equal to or greater than a threshold value, for example.

Incidentally, large touch panels such as electronic whiteboards display an object having a size larger than that of small touch panels such as mobile terminals, and therefore multiple touch gestures using both hands are likely to be performed on the large touch panels. When resizing is performed by two-hand operations, the movable range of hands is large, and therefore the operation amount tends to be increased in comparison with resizing performed by one-hand operations (see FIGS. 1A and 1B).

However, as with the image forming apparatus disclosed in PTL 1, in the case where the expansion-reduction rate for resizing of the object is set to, for example, a constant value without taking into consideration whether the operation is the one-hand operation or the two-hand operation, an operation which is not intended by the user may be reflected on the screen. Illustratively, in the case where the expansion-reduction rate is set to a large value (large difference from 1) on the assumption that resizing is performed by one-hand operations, the object may be excessively enlarged or reduced when resizing is performed by two-hand operations. On the other hand, in the case where the expansion-reduction rate is set to a small value (small difference from 1) on the assumption that resizing is performed by two-hand operations, the gesture operations may have to be repeatedly performed when resizing is performed by one-hand operations.

SUMMARY OF THE INVENTION

An object of the present invention is to provide an information processing device which can improve the operability for resizing of an object using a multiple touch gesture, a non-transitory computer-readable recording medium storing an information processing program, and an information processing method.

To achieve the abovementioned objects, an information processing device reflecting one aspect of the present invention includes: an operation receiver capable of receiving a gesture operation for an object on a screen including resizing, and generating an output according to the gesture operation; and a controller including a microprocessor, and configured to receive an output from the operation receiver and an output from a user motion detector, said user motion detector being configured to detect whether the gesture operation received by the operation receiver is a two-hand operation or a one-hand operation, wherein the controller sets a size change associated with the resizing by the gesture operation to a first degree when the gesture operation for the object is the two-hand operation on a basis of the output from the user motion detector, and sets a size change associated with the resizing by the gesture operation to a second degree which is relatively greater than the first degree when the gesture operation for the object is the one-hand operation on a basis of the output from the user motion detector, identifies the gesture operation received by the operation receiver, and reflects resizing of the object on the screen on a basis of the size change set to the first or second degree when the identified gesture operation is resizing.

A non-transitory computer-readable recording medium stores therein an information processing program reflecting one aspect of the present invention and causing a computer of an information processing device including an operation receiver capable of receiving a gesture operation for an object on a screen including resizing, and generating an output according to the gesture operation to execute: determining whether the gesture operation received by the operation receiver is a two-hand operation or a one-hand operation; setting a size change associated with the resizing by the gesture operation to a first degree when the gesture operation for the object is the two-hand operation, and setting a size change associated with the resizing by the gesture operation to a second degree which is relatively greater than the first degree when the gesture operation for the object is the one-hand operation; identifying the gesture operation received by the operation receiver; and reflecting resizing of the object on the screen on a basis of the size change set to the first or second degree when the identified gesture operation is resizing.

An information processing method reflecting one aspect of the present invention is used in an information processing device including an operation receiver capable of receiving a gesture operation for an object on a screen including resizing, and generating an output according to the gesture operation, the method including: determining whether the gesture operation received by the operation receiver is a two-hand operation or a one-hand operation; setting a size change associated with the resizing by the gesture operation to a first degree when the gesture operation for the object is the two-hand operation, and setting a size change associated with the resizing by the gesture operation to a second degree which is relatively greater than the first degree when the gesture operation for the object is the one-hand operation; identifying the gesture operation received by the operation receiver; and reflecting resizing of the object on the screen on a basis of the size change set to the first or second degree when the identified gesture operation is resizing.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, an embodiment of the present invention is described in detail with reference to the accompanying drawings.

Figure 1A:
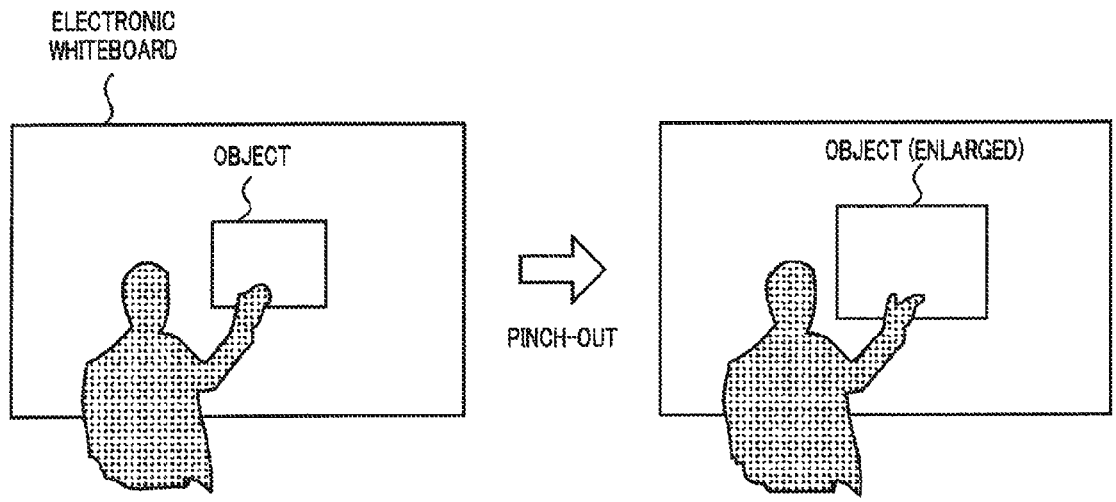
FIGS. 1A and 1B illustrate a gesture operation on an electronic whiteboard.
Figure 1B:
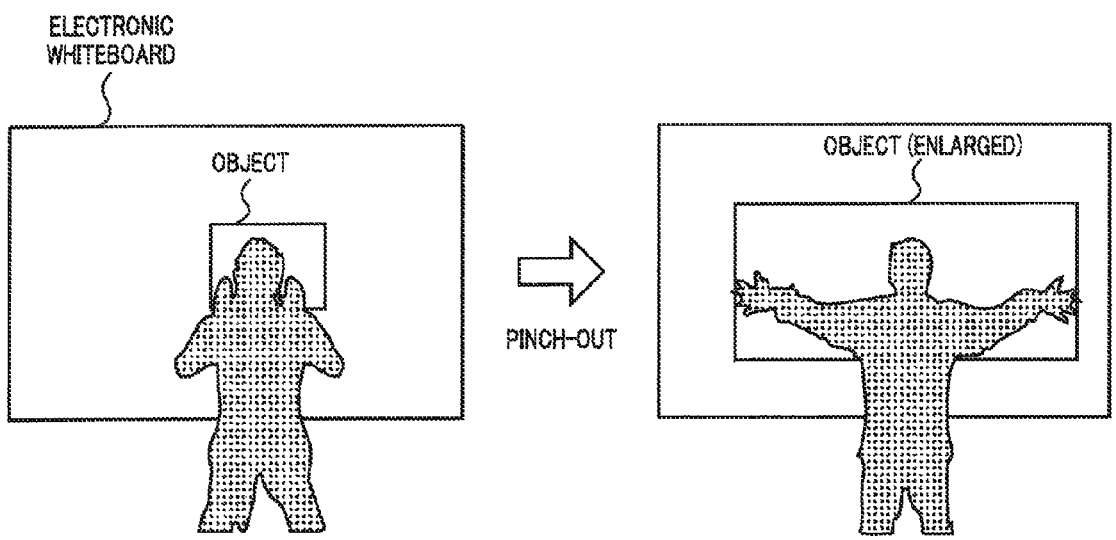
Figure 2:
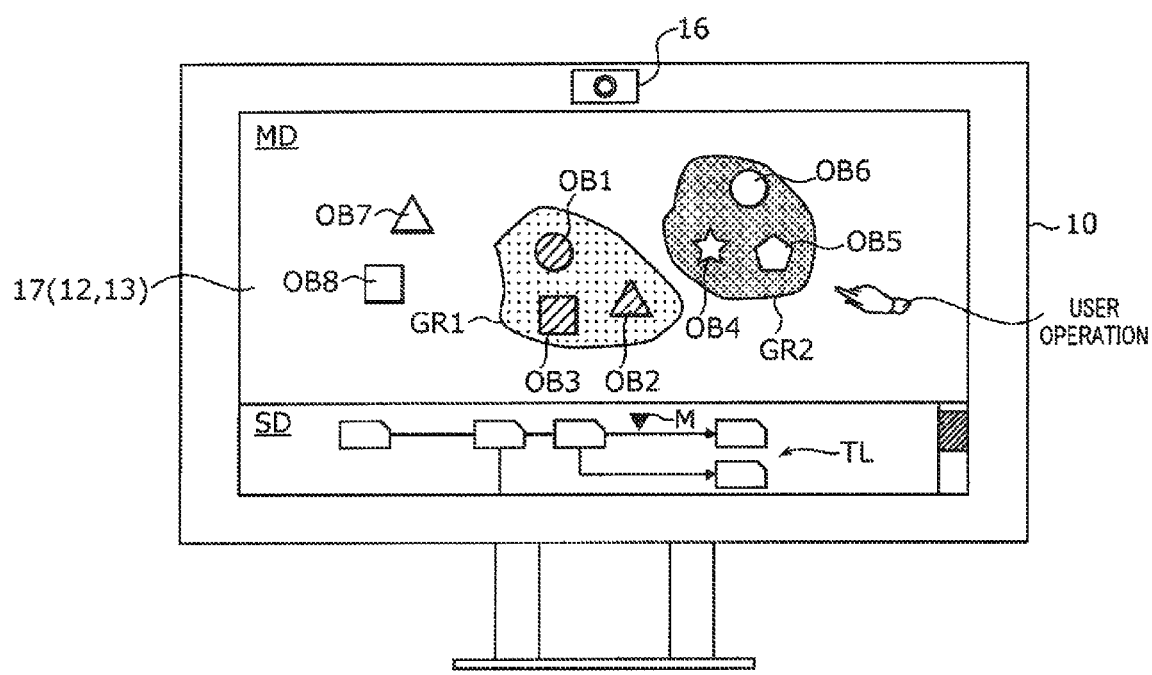
FIG. 2 is a schematic view of an electronic whiteboard according to an embodiment of the present invention.

FIG. 2 is a schematic view of electronic whiteboard 10, which serves as an information processing device according to an embodiment of the present invention. Electronic whiteboard 10 is used as a conference support apparatus that stores screen transition based on a user operation, and manages the flow of the conference in a time-series manner, for example. Specifically, when a user adds objects of elements of the proceedings to the display region of display section 13 or operates displayed objects from operation receiver 12 of electronic whiteboard 10 in a conference, information relating to the screen (hereinafter referred to as "screen information") at this time is stored.

Here, the object is data to be operated, and is displayed on display section 13 in the form of a text box in which letters or marks are input, a diagram, a photographic image, a work area (window) of an application, or the like. In the present embodiment, the object is displayed in the form of a simple diagram. In addition, operations of changing the state of objects such as adding (newly creating), moving, resizing (expanding and reducing), rotating, editing, deleting, grouping, ungrouping and the like of objects are referred to as "object operation."

In FIG. 2, display section 13 of electronic whiteboard 10 is sectioned into main screen MD on which objects are displayed, and sub-screen SD on which a tree structure diagram (hereinafter referred to as "time line") capable of visually presenting the flow of the conference is displayed. Main screen MD is an individual work area of electronic whiteboard 10. It is possible to adopt a configuration in which main screen MD is normally displayed while the sub-screen is displayed as necessary, or a configuration in which switching between main screen MD and sub-screen SD is performed and sub-screen SD is displayed on the entire display region.

In FIG. 2, eight objects, OB1 to OB8, are created on main screen MD, and objects OB1 to OB3, and objects OB4 to OB6 are grouped into respective groups (GR1 and GR2). Time line TL of a case where the discussion is branched at a certain time point is displayed on sub-screen SD. When the discussion is branched in the course of the discussion, multiple conclusions are obtained.

The user performs an object operation on main screen MD, and a time line operation on sub-screen SD. The time line operation refers to an operation that is performed utilizing time line TL, and includes an operation of moving marker M, and a branching operation of branching a discussion. For example, the user can reproduce a screen at an arbitrary time point on main screen MD by moving marker M on time line TL.

Of the object operations, dragging, resizing, and rotating of the object are performed by gesture operations (which include a single touch gesture and a multiple touch gesture). It is to be noted that resizing includes deformation of an object by enlarging/reducing the object to a similar shape in longitudinal and lateral directions, and deformation of an object by enlarging/reducing the object only in a vertical direction or only in a lateral direction.

Figure 3:
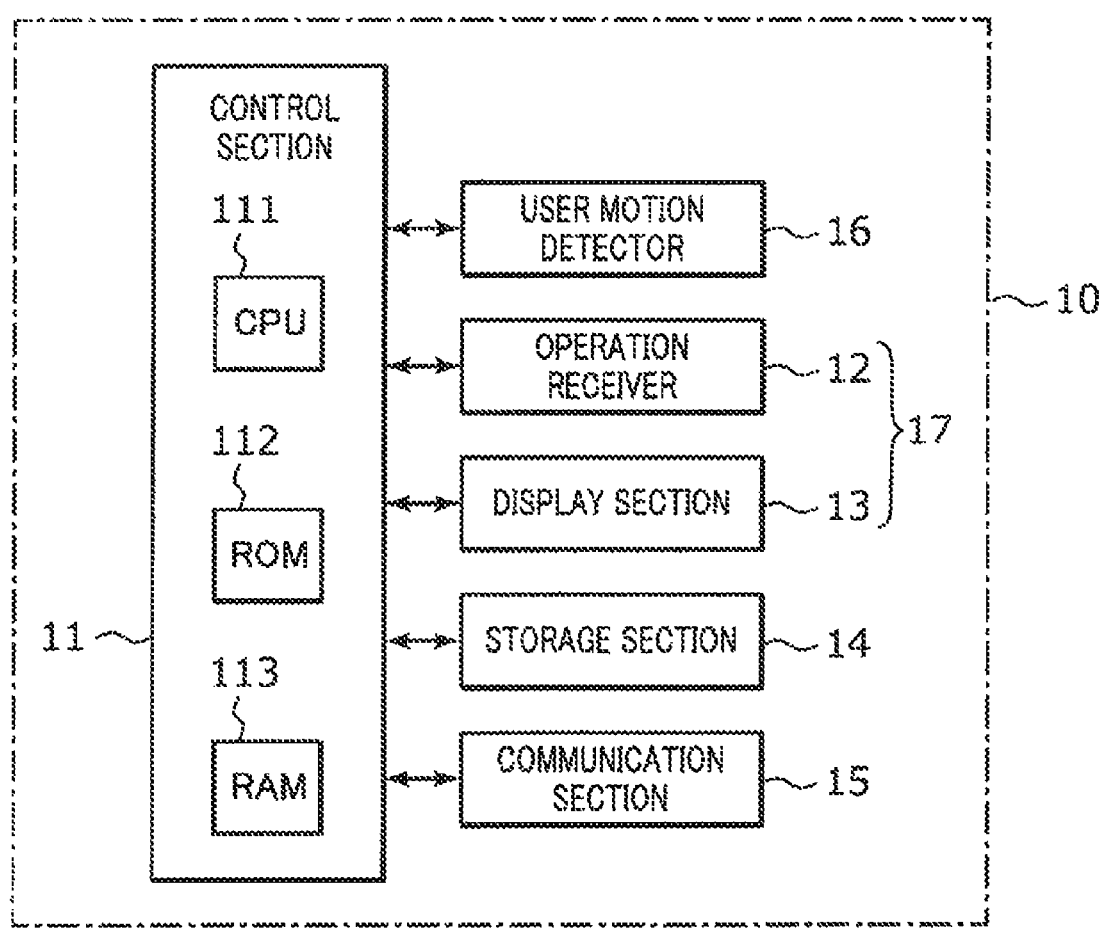
FIG. 3 is a block diagram illustrating a hardware configuration of the electronic whiteboard.

FIG. 3 illustrates an exemplary hardware configuration of electronic whiteboard 10. As illustrated in FIG. 3, electronic whiteboard 10 includes control section 11, operation receiver 12, display section 13, storage section 14, communication section 15, user motion detector 16 and the like. The blocks are electrically connected through a bus line. When an information processing program described later is executed by control section 11, an information processing method of the present embodiment is achieved.

Control section 11 includes central processing unit (CPU) 111 serving as a computing/controlling apparatus, random access memory (RAM) 113 and read only memory (ROM) 112 serving as a main storage apparatus. ROM 112 stores basic setting data and a basic program called basic input output system (BIOS). CPU 111 reads out a program suited to processing details from ROM 112 or storage section 14, develops the program in RAM 113, and controls each block in cooperation with the developed program.

Operation receiver 12 and display section 13 are composed of a flat panel display provided with a large touch panel which can be operated with hands, for example. Various kinds of conventionally known devices such as liquid crystal displays, organic EL displays, and electronic paper displays having a memory performance may be adopted as the flat panel display. In the following description, a component having a function of operation receiver 12 and a function of display section 13 as the flat panel display is referred to as "operation display section 17." It is to be noted that operation receiver 12 and display section 13 may be separated members.

Operation receiver 12 receives handwriting input, an object operation, and a time line operation of the user, and outputs a signal corresponding to the received operation (for example, a signal indicating the coordinate of the touch point) to control section 11. While it is assumed in the following description that the user performs operations using his or her fingers of one hand or both hands, operations may be performed with use of body parts other than fingers, or contact members such as a stylus. In addition, operation receiver 12 has an operation region in which the user can perform a multiple touch gesture with both hands without any trouble.

In accordance with the display control information input from control section 11, display section 13 displays various kinds of information on main screen MD and sub-screen SD. When operation receiver 12 receives a gesture operation, the operation assigned to the gesture operation is reflected on the screen of display section 13. Discrimination of the gesture operation (which includes validity/invalidity) is performed by control section 11.

Storage section 14 is, for example, an auxiliary storage apparatus such as a hard disk drive (HDD), a solid state drive (SSD), and a secure digital (SD) card, and stores an information processing program, information relating to screens, and the like. Storage section 14 includes object information table 141, screen transition information table 142, gesture operation table 143 and the like (see FIG. 4).

Communication section 15 is, for example, a communication interface such as a network interface card (NIC), a modulator-demodulator (MODEM), and a universal serial bus (USB). Control section 11 transmits and receives various kinds of information to and from a terminal apparatus (not illustrated) connected to a network such as a cable LAN and a wireless LAN through communication section 15. Communication section 15 may be composed of a communication interface for near field wireless communications such as near field communication (NFC), Bluetooth (registered trademark) and the like.

User motion detector 16 is a sensor configured to detect the position of the user with respect to operation display section 17, and the operation mode of the user with respect to operation display section 17, that is, whether the gesture operation of the user is a one-hand operation or a two-hand operation. User motion detector 16 may be composed of Kinect (registered trademark) which irradiates a targeted object with an infrared special pattern from an infrared ray projector, and images and analyzes a pattern distorted by the targeted objects with an infrared ray camera (depth sensor) to measure the distance from the targeted object, for example. Whether the gesture operation of the user is a one-hand operation or a two-hand operation can be detected by analyzing the distance from the targeted object measured with Kinect.

With the configuration in which the object operation of the user is received with a touch panel, and motion detector 16 including a motion sensor such as the above-described Kinect configured to optically detect motion of the hand of the user is provided such that the object operation, determination of the gesture of the hand of the user, and determination of both hands/one hand are detected with different detection devices, determination of both hands/one hand can be surely performed, and the object operation can be correctly performed.

It is to be noted that user motion detector 16 may be composed of a sensor (for example, Leap Motion Controller available from Leap Motion which is configured to perform 3D imaging with two infrared ray cameras, and the like) other than Kinect, or operation receiver 12 may serve also as user motion detector 16. In the case where operation receiver 12 serves also as user motion detector 16, determination of one hand/both hands can be performed based on the state (number, and area) of the touch point and the coordinate thereof, for example.

User motion detector 16 may be composed of a member which is separated from electronic whiteboard 10 such that electronic whiteboard 10 receives an output signal from user motion detector 16 in a wired or wireless manner. In this case, user motion detector 16 may be installed at a position away from electronic whiteboard 10, or may be attached to electronic whiteboard 10.

Figure 4:
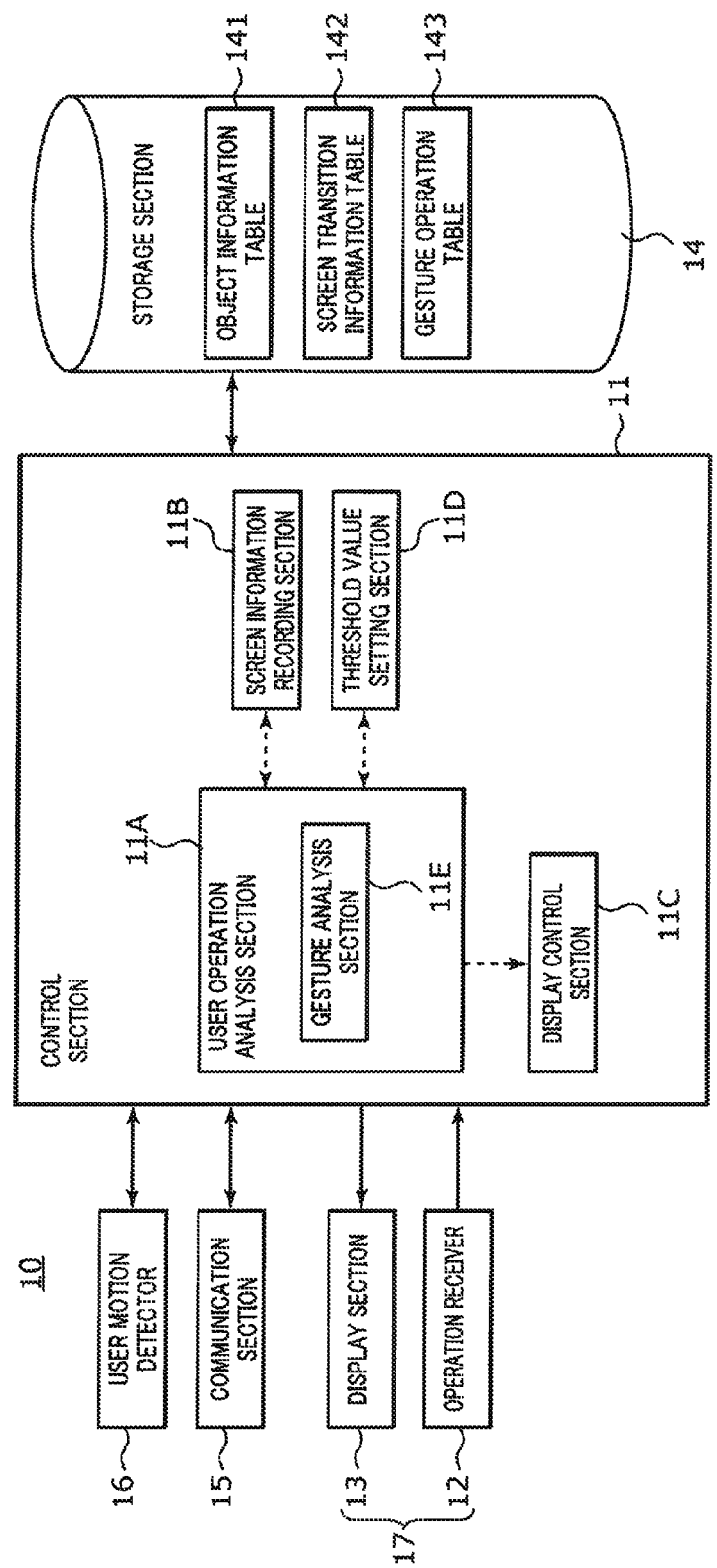
FIG. 4 is a functional block diagram illustrating a function of a control section of the electronic whiteboard.

FIG. 4 is a functional block diagram illustrating a function of control section 11 of electronic whiteboard 10. As illustrated in FIG. 4, control section 11 functions as user operation analysis section 11A, screen information recording section 11B, display control section 11C, and expansion-reduction rate setting section 11D. A part or all of these functional parts may be configured by a dedicated hardware.

User operation analysis section 11A analyzes operation information input from operation receiver 12 and identifies the operation of the user. Screen information recording section 11B and display control section 11C execute a predetermined process (for example, an object is enlarged by pinch-out or the like) which is preliminarily set in association of the details of the operation on the basis of the user operation identified by user operation analysis section 11A.

User operation analysis section 11A includes gesture analysis section 11E that analyzes the gesture operation performed by the user. When a touch by the user on operation receiver 12 is detected, gesture analysis section 11E determines whether the gesture operation is valid. To be more specific, gesture analysis section 11E calculates the measured value of the determination index which is set for each gesture operation (for example, dragging, resizing, and rotating) on the basis of change of the coordinate of the touch point, and compares the measured value with a predetermined threshold value to determine whether the gesture operation is valid. For example, the sliding speed may be used as the determination index of dragging, the point distance change speed may be used as the determination index of resizing, and the rotating speed may be used as the determination index of rotating.

Screen information recording section 11B records the flow of a conference (screen transition) based on an object operation performed by the user in storage section 14 as screen information. The screen information is information representing elements of a screen and times when the elements are created and changed. The screen information includes object information for individually managing operations on objects or groups, and screen transition information for managing the flow of a conference in a time-series manner. The object information is stored in object information table 141 of storage section 14, and the screen transition information is stored in screen transition information table 142 of storage section 14.

Display control section 11C generates display control information (screen data) for displaying a screen based on a user operation on display section 13, and controls display section 13 to display the screen based on the screen data. When generating the display control information, display control section 11C acquires required information from storage section 14. The display control information includes screen display control information for displaying a screen reflecting the object operation. When a gesture operation is determined to be valid by gesture analysis section 11E, display control section 11C refers to gesture operation table 143, and reflects a process assigned to the gesture operation on the screen of display section 13.

Expansion-reduction rate setting section 11D sets an expansion-reduction rate used for resizing. Here, the "expansion-reduction rate" is a parameter which indicates the degree of the size change associated with resizing by a reference operation (for example, a pinch-out operation or a pinch-in operation having a certain variation or change rate). When the point distance change amount (operation amount) is multiplied by the expansion-reduction rate, the expansion amount/reduction amount of an object is obtained, and when the point distance change rate (operation rate) is multiplied by the expansion-reduction rate, the expansion rate/reduction rate of an object is obtained. In the present embodiment, the expansion-reduction rate indicates the degree of the size change associated with resizing of an object by a pinch-out operation or a pinch-in operation having a certain variation. That is, at the time of resizing, an object is enlarged or reduced by an amount corresponding to the operation amount [pixel] (change of the distance between two touch points)×the expansion-reduction rate. Expansion-reduction rate setting section 11D sets an expansion-reduction rate based on whether the gesture operation of the user is a one-hand operation or a two-hand operation. While it is assumed here that the expansion rate of the case where an object is enlarged by pinch-out and the reduction rate of the case where the size of an object is reduced by pinch-in have the same value, the expansion rate and the reduction rate may be separately set.

Figure 5:
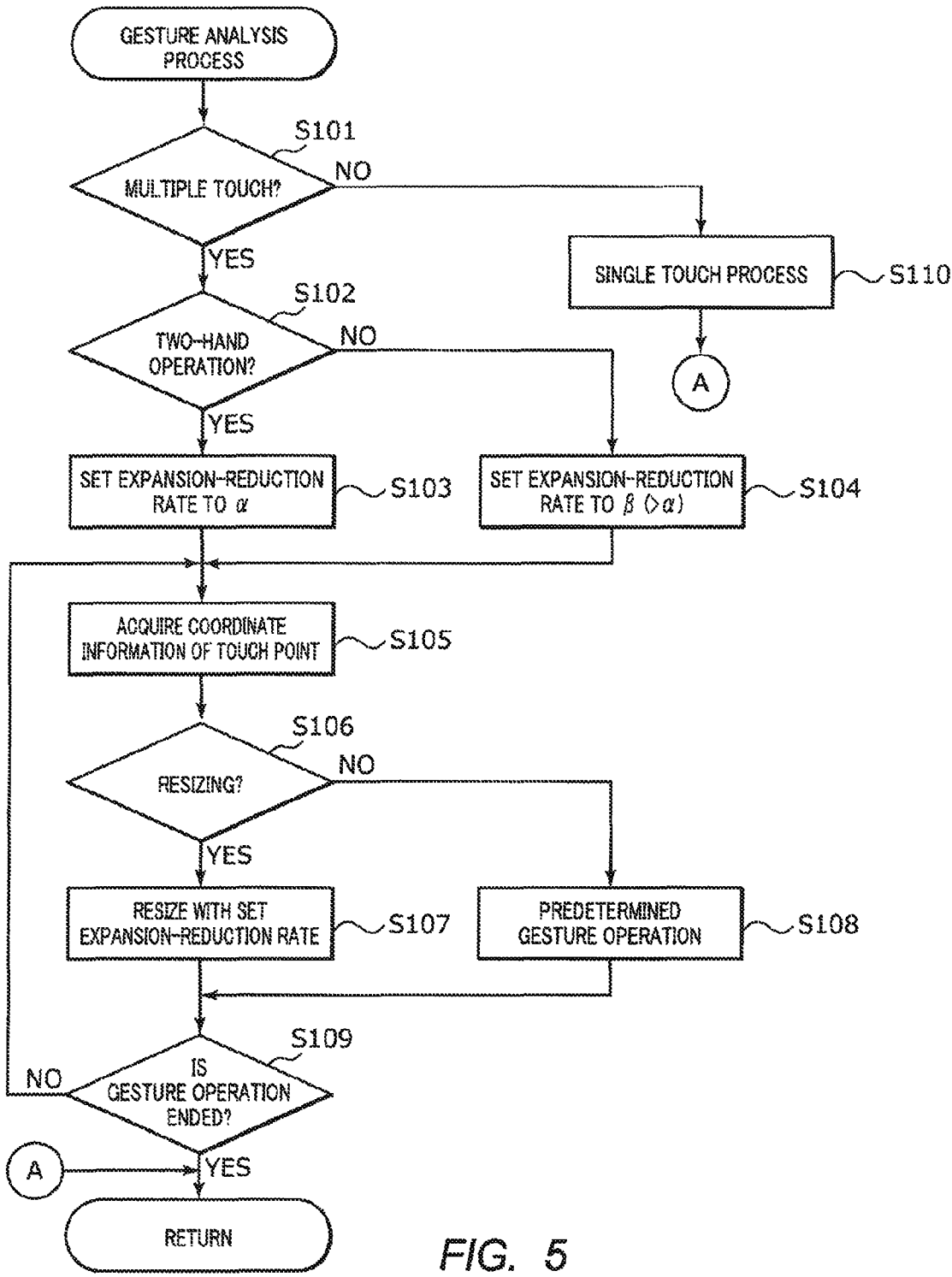
FIG. 5 is a flowchart of an exemplary gesture analysis process.

FIG. 5 is a flowchart of an exemplary gesture analysis process executed by control section 11. This process is achieved when CPU 111 reads out and executes an information processing program stored in ROM 112 in response to turning on of the power of electronic whiteboard 10, execution of the main flow not illustrated, and detection of a gesture operation in the main flow, for example.

At step S101, control section 11 determines whether an operation of touching two points in a region of an object (hereinafter referred to as "multiple touch") is performed via operation receiver 12. When a multiple touch is detected ("YES" at step S101), the process is advanced to step S102.

On the other hand, when it is determined that an operation of touching only one point in an object region (hereinafter referred to as "single touch") is performed ("NO" at step S101), the process is advanced to step S110. At step S110, a process (for example, object selection, cancellation of object selection, object movement or the like) corresponding to a single touch is executed. It is to be noted that, when it is determined that the touch operation is completed in the process corresponding to a single touch, the process is returned to the main flow. In addition, when the touch operation is changed from the single touch to the multiple touch, the process is advanced to step S102.

At step S102, control section 11 determines whether the multiple touch is a one-hand operation of one user or a two-hand operation of one user on the basis of the detection result of user motion detector 16. When it is determined that the multiple touch is a two-hand operation ("YES" at step S102), the process is advanced to step S103. When it is determined that the multiple touch is a one-hand operation ("NO" at step S102), the process is advanced to step S104.

At step S103, control section 11 sets the expansion-reduction rate of the resizing to the first expansion-reduction rate α (a process performed as expansion-reduction rate setting section 11D). When the size of the object is changed by a two-hand operation, expansion-reduction rate α is set to a value close to 1 (for example, α=1.2). In this manner, the object is deformed to follow the motion of the both hands, and thus the user can directly recognize the operation amount of the resizing. In other words, the amount of expansion and reduction by the both hands of the user can be prevented from excessively increased.

At step S104, control section 11 sets the expansion-reduction rate of the resizing to second expansion-reduction rate β which is greater than first expansion-reduction rate α (for example, β=1.5) (a process performed as expansion-reduction rate setting section 11D). In another words, first expansion-reduction rate α is smaller than second expansion-reduction rate β. In this manner, when the size of the object is changed by a one-hand operation, the object can be efficiently deformed. It is also possible to set the expansion-reduction rate in accordance with the size of the object in the case of a one-hand operation in consideration of the operability for operating an extremely large object with one hand.

At step S105, control section 11 acquires the coordinate information of the touch point at a predetermined time (unit time) interval. The acquired coordinate information is sequentially stored in RAM 113 until the contacting of the user on operation receiver 12 is canceled, for example.

At step S106, on the basis of the change of the coordinate of the touch point, control section 11 determines whether the gesture operation which is being executed is the resizing (a process performed as gesture analysis section 11E). When it is determined that the gesture operation which is being executed is resizing ("YES" at step S106), the process is advanced to step S107. When it is determined that the gesture operation which is being executed is not resizing ("NO" at step S106, for example, a case where the gesture operation is dragging or rotating), the process is advanced to step S108.

Specifically, at step S106, control section 11 calculates measured values $M_m$, $D_m$, and $\theta_m$ of the determination indices of dragging, resizing, and rotating (sliding speed, point distance change speed, and rotating speed) on the basis of the change of the coordinate of the touch point (a process performed as gesture analysis section 11E). Then, control section 11 compares threshold values of $M_{th}$, $D_{th}$, and $\theta_{th}$ of the determination indices of dragging, resizing, and rotating with measured values $M_m$, $D_m$, and $\theta_m$. When measured value $M_m$ of the sliding speed is greater than threshold value $M_{th}$, the gesture operation which is being executed is dragging. When measured value $D_m$ of the point distance change speed is greater than threshold value $D_{th}$, the gesture operation which is being executed is resizing. When measured value $\theta_m$ of the rotating speed is determined to be greater than threshold value $\theta_{th}$, the gesture operation which is being executed is rotating. It is to be noted that, when all of the gesture operations are invalid, the processes of steps S105 and S106 are repeated.

At step S107, control section 11 refers to gesture operation table 143 and reflects a process assigned to resizing on the screen of display section 13 (a process performed as display control section 11C). To be more specific, with use of the set expansion-reduction rate (first expansion-reduction rate $\alpha$ or second expansion-reduction rate $\beta$), the object is enlarged or reduced by an amount corresponding to the operation amount [pixel]×the expansion-reduction rate. In the case of a two-hand operation, resizing of the object is performed to follow the motion of the both hands on the screen of display section 13. In addition, in the case of a one-hand operation, resizing of the object is performed by an amount greater than the motion of the hand, that is, resizing of the object is performed in an efficient manner.

At step S108, control section 11 refers to gesture operation table 143 and reflects a process assigned to the identified gesture operation (a gesture operation other than resizing such as dragging or rotating, for example) on the screen of display section 13. Here, in the case where the identified gesture operation is a dragging operation of an object, the movement amount of the object relative to the operation amount of the user in the dragging direction is controlled to be equal between the one-hand operation and the two-hand operation. In addition, in the case where the identified gesture operation is a rotating operation of the object, the rotating amount of the object relative to the operation amount of the user in the rotational direction is controlled to be equal between the one-hand operation and the two-hand operation.

At step S109, control section 11 determines whether the multiple touch gesture is completed. To be more specific, when the finger is detached from operation receiver 12 and the multiple touch is not detected, control section 11 determines that the multiple touch gesture is completed. When the multiple touch gesture is completed ("YES" at step S109), the process is returned to the main flow. When the multiple touch gesture is not completed ("NO" at step S109), the process is advanced to step S105. It is to be noted that, when the touch operation is changed from the multiple touch to the single touch, the process is advanced to step S110.

Electronic whiteboard 10 which has been described as an exemplary information processing device includes: operation receiver 12 capable of receiving a gesture operation including resizing by a two-hand operation and a one-hand operation for an object on a screen; user motion detector 16 configured to detect whether the gesture operation performed via operation receiver 12 is a two-hand operation or a one-hand operation; expansion-reduction rate setting section 11D configured to set the expansion-reduction rate of resizing to the first expansion-reduction rate $\alpha$ when the gesture operation is a two-hand operation, and set when the gesture operation is the one-hand operation sets the expansion-reduction rate to the second expansion-reduction rate $\beta$ which is greater than first expansion-reduction rate $\alpha$ on the basis of the user operation detected by user motion detector 16; and display control section 11C configured to reflects resizing of the object on the screen on a basis of the expansion-reduction rate set by expansion-reduction rate setting section 11D when the gesture operation the identified by gesture analysis section 11E is resizing.

According to electronic whiteboard 10, the expansion-reduction rate of resizing is appropriately set based on whether the operation is a one-hand operation or a two-hand operation, and thus the user can readily enlarge or reduce the object to a desired size. Accordingly, the operability of resizing performed by a multiple touch gesture is remarkably improved.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, in the flowchart illustrated in FIG. 5, while expansion-reduction rate $\alpha$ at the time of resizing by the two-hand operation is set to a constant value, first expansion-reduction rate $\alpha$ may be gradually increased in a predetermined period at the start of resizing (for example, for 500 msec after measured value $D_m$ of the point distance change speed exceeds threshold value $D_m$) and set to a constant value after the predetermined period has elapsed. For example, the initial value of first expansion-reduction rate $\alpha$ is set to 0.90 (<1), and first expansion-reduction rate $\alpha$ is gradually increased to 1.2 and kept at 1.2. In this manner, an animation display having a poor followability is set at the start of resizing by a two-hand operation (see FIG. 6). Accordingly, heavy feeling can be given to a large-sized object which can be easily operated with both hands, and thus the operation feeling of the user can be stimulated.

In addition, for example, in a predetermined period at completion of resizing (for example, for 500 msec after measured value $D_m$ of the point distance change speed becomes 0), resizing may be continued while gradually reducing first expansion-reduction rate $\alpha$. In this manner, an animation display in which resizing is continued through inertia even after completion of a gesture operation is set (see FIG. 7). Accordingly, heavy feeling can be given to a large-sized object which can be easily operated with both hands, and thus the operation feeling of the user can be stimulated.

Figure 6:
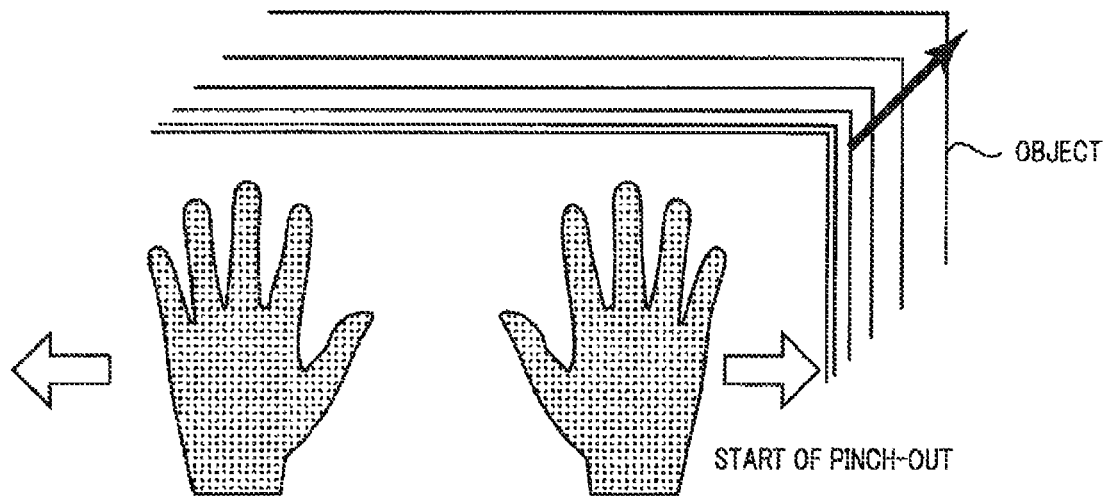
FIG. 6 illustrates an exemplary animation display at start of pinch-out.
Figure 7:
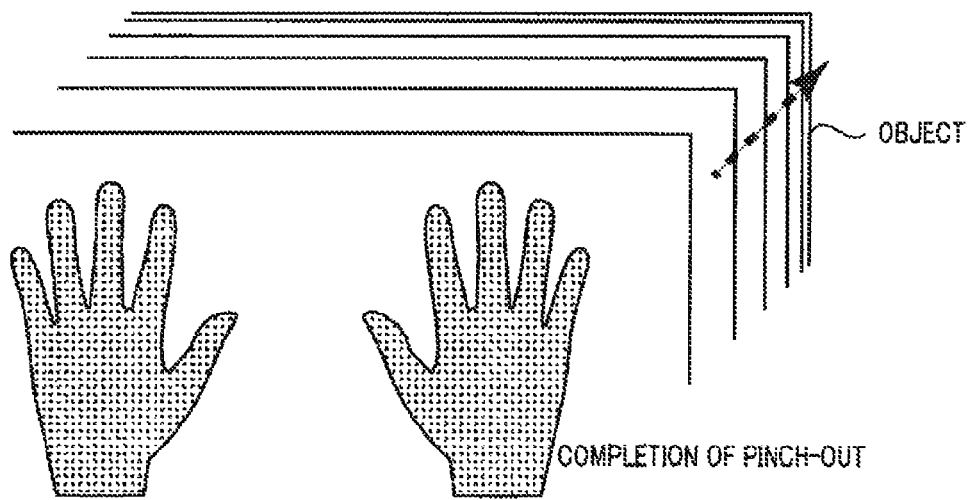
FIG. 7 illustrates an exemplary animation display at completion of pinch-out.

In addition, at the time of setting the expansion-reduction rate, the reference expansion-reduction rate set in advance may be multiplied by a correction coefficient, or a correction amount may be added to or subtracted from the reference expansion-reduction rate set in advance such that the expansion-reduction rate is adjusted to an appropriate value. While FIG. 6 and FIG. 7 illustrate $\alpha$ state where an object is enlarged, the above-described control is also applicable to reduction of an object. In addition, the control of providing heavy feeling to the user which has been described with reference to FIG. 6 and FIG. 7 is also applicable to the rotating operation.

Figure 8:
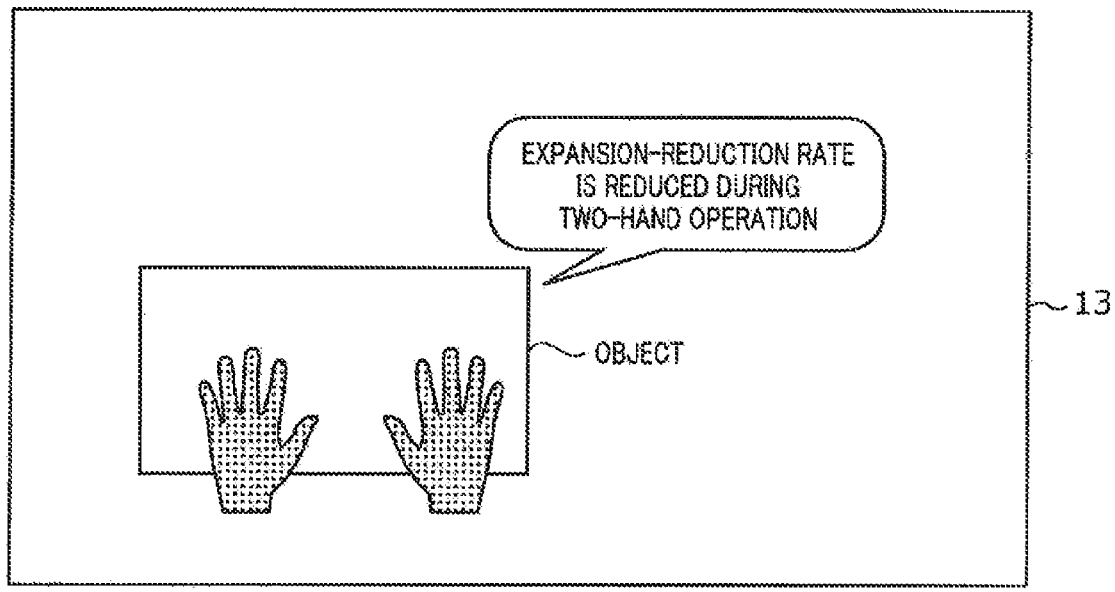
FIG. 8 is an exemplary message which is displayed at a two-hand operation.

Furthermore, electronic whiteboard 10 may be provided with an indicator (a notification section) configured to indicate that the expansion-reduction rate of the resizing is different between the two-hand operation and the one-hand operation. For example, as illustrated in FIG. 8, when a multiple touch is detected, a message indicating that the expansion-reduction rate is reduced during a two-hand operation is displayed on display section 13. In this manner, the user can recognize that the expansion-reduction rate of the resizing is different between the one-hand operation and the two-hand operation, and can perform a gesture operation in consideration of the expansion-reduction rate. Accordingly, since an object can be resized to a desired size, operability is further improved.

Figure 9A:
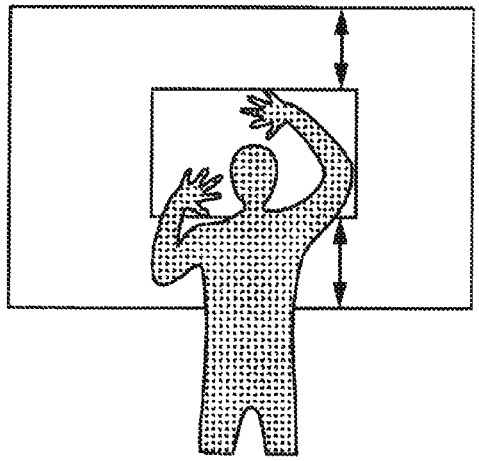
FIGS. 9A, 9B and 9C illustrate a gesture operation on an electronic whiteboard.
Figure 9B:
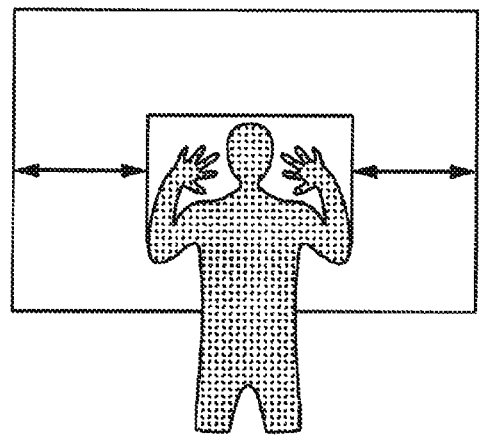
Figure 9C:
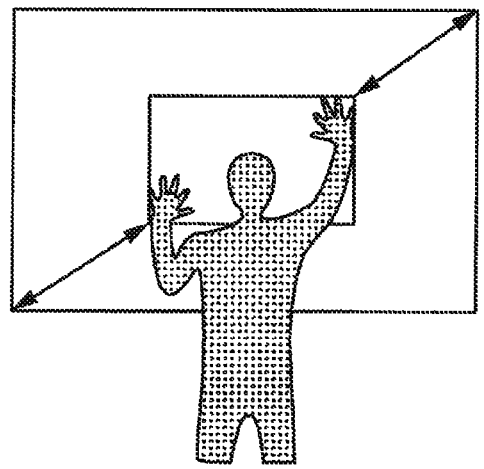

In addition, in the case where the user performs resizing of a rectangular object by a two-hand operation, the expansion-reduction rate may be set in accordance with the direction of the two-hand operation. For example, relative to expansion-reduction rate $\alpha 1$ of a two-hand operation along the short direction of an object (see FIG. 9A), expansion-reduction rate $\alpha 2$ of a two-hand operation along the longitudinal direction (see FIG. 9B) and expansion-reduction rate $\alpha 3$ of a two-hand operation along a diagonal direction (see FIG. 9C) may be set to a smaller value (for example, $\alpha 1 > \alpha 2 > \alpha 3$).

Figure 10:
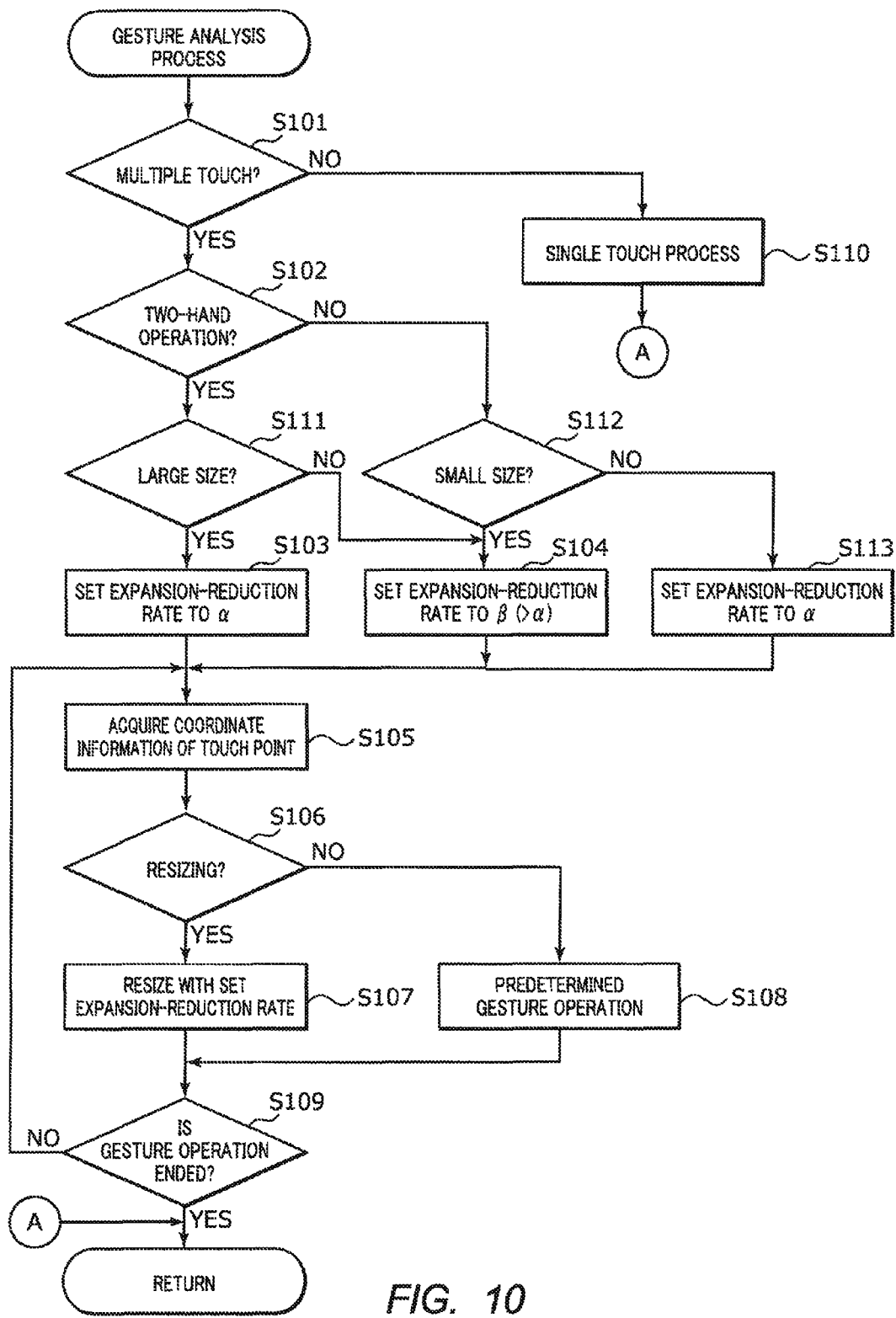
FIG. 10 is a flowchart of an exemplary gesture analysis process.

Further, determination of the object size may be performed in addition to the determination of the two-hand operation/one-hand operation to set the expansion-reduction rate based on both of determination result. For example, as illustrated in FIG. 10, in the case where a two-hand operation is performed but the size of the object is not so large ("YES" at step S102→"NO" at step S111), the expansion-reduction rate is controlled such that the expansion-reduction rate is not set to a small size (step S104). In addition, in the case where a one-hand operation is performed but the size of the object is relatively large ("NO" at step S102→"NO" at step S112), the expansion-reduction rate is controlled such that the expansion-reduction rate is set to a small size (step S113).

While electronic whiteboard 10 executes an information processing program to achieve the above-described information process in the embodiment, the information process may also be achieved with use of a hardware circuit. The information processing program may be stored in a computer-readable storage medium such as a magnetic disc, an optical disk, and a flash memory so as to be provided to an apparatus (for example, a personal computer) which can be used as the conference support apparatus. Alternatively, the information processing program may be provided by downloading through communication lines such as the Internet.

The information processing device of the embodiment of the present invention is applicable to, in addition to the electronic whiteboard described in the embodiment provided with the touch panel and the user motion detector, an information processing device and an information process system in which an object operation can be performed with a motion sensor capable of detecting the motion of the hand of the user with higher accuracy. The information processing device of the embodiment of the present invention is also applicable to a head-mount display information processing device provided with a motion sensor configured to detect the motion of the hand of the user.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

What is claimed is:

1. An information processing device comprising:
   an operation receiver capable of receiving a gesture operation for an object on a screen including resizing, and generating an output according to the gesture operation; and
   a controller including a microprocessor, and configured to receive an output from the operation receiver and an output from a user motion detector, said user motion detector being configured to detect whether the gesture operation received by the operation receiver is a two-hand operation or a one-hand operation, wherein
   the controller
   sets a size change associated with the resizing by the gesture operation to a first degree when the gesture operation for the object is the two-hand operation on a basis of the output from the user motion detector, and sets a size change associated with the resizing by the gesture operation to a second degree which is relatively greater than the first degree when the gesture operation for the object is the one-hand operation on a basis of the output from the user motion detector,
   identifies the gesture operation received by the operation receiver, and
   reflects resizing of the object on the screen on a basis of the size change set to the first or second degree when the identified gesture operation is resizing.

2. The information processing device according to claim 1, wherein the controller gradually increases the first degree in a predetermined period at start of the resizing.

3. The information processing device according to claim 1, wherein the controller gradually reduces the first degree in a predetermined period at completion of the resizing.

4. The information processing device according to claim 1 further comprising an indicator configured to indicate that the first degree and the second degree are different from each other.

5. The information processing device according to claim 1, wherein the operation receiver comprises a flat panel display provided with a touch panel.

6. The information processing device according to claim 1, wherein the user motion detector includes a motion sensor configured to optically detect a motion of a hand of a user.

7. The information processing device according to claim 1, wherein
   the controller sets the size change to the first degree based on whether the gesture operation is resizing along a short direction of the object or resizing along a longitudinal direction of the object when the object has a rectangular shape, and
   the first degree set for the resizing along the short direction is relatively greater than the first degree set for the resizing along the longitudinal direction.

8. The information processing device according to claim 1, wherein, when the identified gesture operation is rotating, the controller operates such that a rate of a rotating amount of the object and a rate of an operation amount in a rotational direction are equal to each other between rotating by the one-hand operation and rotating by the two-hand operation.

9. The information processing device according to claim 1, wherein, when the identified gesture operation is dragging, the controller operates such that a rate of a movement amount of the object and a rate of an operation amount in a dragging direction are equal to each other between dragging by the one-hand operation and dragging by the two-hand operation.

10. The information processing device according to claim 2, wherein the first degree at the start of the resizing is an expansion-reduction rate which is smaller than 1.

11. A non-transitory computer-readable recording medium storing an information processing program which causes a computer of an information processing device including an operation receiver, wherein the operation receiver is capable of receiving a gesture operation for an object on a screen including resizing, and generates an output according to the gesture operation, said information processing program causing the computer to execute:
   determining whether the gesture operation received by the operation receiver is a two-hand operation or a one-hand operation;
   setting a size change associated with the resizing by the gesture operation to a first degree when the gesture operation for the object is the two-hand operation, and setting a size change associated with the resizing by the gesture operation to a second degree which is relatively greater than the first degree when the gesture operation for the object is the one-hand operation,
   identifying the gesture operation received by the operation receiver, and
   reflecting resizing of the object on the screen on a basis of the size change set to the first or second degree when the identified gesture operation is resizing.

12. The non-transitory computer-readable recording medium storing an information processing program according to claim 11, wherein the first degree is gradually increased in a predetermined period at start of the resizing.

13. The non-transitory computer-readable recording medium storing an information processing program according to claim 11, wherein the first degree is gradually reduced in a predetermined period at completion of the resizing.

14. The non-transitory computer-readable recording medium storing an information processing program according to claim 11 further causing the computer to execute:
   indicating that the first degree and the second degree are different from each other.

15. The non-transitory computer-readable recording medium storing an information processing program according to claim 11, wherein
   the size change is set to the first degree based on whether the gesture operation is resizing along a short direction of the object or resizing along a longitudinal direction of the object when the object has a rectangular shape, and
   the first degree set for the resizing along the short direction is relatively greater than the first degree set for the resizing along the longitudinal direction.

16. The non-transitory computer-readable recording medium storing an information processing program according to claim 11 further causing the computer to execute:
   operating such that, when the identified gesture operation is rotating, a rate of a rotating amount of the object and a rate of an operation amount in a rotational direction are equal to each other between rotating by the one-hand operation and rotating by the two-hand operation.

17. The non-transitory computer-readable recording medium storing an information processing program according to claim 11 further causing the computer to execute:
   operating such that, when the identified gesture operation is dragging, a rate of a movement amount of the object and a rate of an operation amount in a dragging direction are equal to each other between dragging by the one-hand operation and dragging by the two-hand operation.

18. An information processing method which is used in an information processing device including an operation receiver capable of receiving a gesture operation for an object on a screen including resizing, and generating an output according to the gesture operation, the method comprising:
   determining whether the gesture operation received by the operation receiver is a two-hand operation or a one-hand operation;
   setting a size change associated with the resizing by the gesture operation to a first degree when the gesture operation for the object is the two-hand operation, and setting a size change associated with the resizing by the gesture operation to a second degree which is relatively greater than the first degree when the gesture operation for the object is the one-hand operation;
   identifying the gesture operation received by the operation receiver; and
   reflecting resizing of the object on the screen on a basis of the size change set to the first or second degree when the identified gesture operation is resizing.

19. The information processing method according to claim 18 further comprising,
   when the identified gesture operation is rotating, performing a control such that a rate of a rotating amount of the object and a rate of an operation amount in a rotational direction are equal to each other between rotating by the one-hand operation and rotating by the two-hand operation.

20. The information processing method according to claim 18 further comprising,
   when the identified gesture operation is dragging, performing a control such that a rate of a movement amount of the object and a rate of an operation amount in a dragging direction are equal to each other between dragging by the one-hand operation and dragging by the two-hand operation.

21. An information processing device configured to resize an object on a screen by an operation, the operation being either a pinch-out operation or a pinch-in operation, and the operation being either a two-hand operation performed with two hands or a single-hand operation performed with a single hand, the information processing device comprising:
   a first controller configured to resize the object at a first rate when the operation is a two-hand operation, and
   a second controller configured to resize the object at a second rate greater than the first rate when the operation is a single-hand operation.

22. The information processing device according to claim 21, further comprising a detector configured to detect whether the pinch-out or pinch-in operation is a two-hand operation or a single-hand operation.

* * * * *